United States Patent

Fusejima et al.

[11] Patent Number: 5,531,826
[45] Date of Patent: Jul. 2, 1996

[54] GRANULAR MATERIAL COATING APPARATUS

[75] Inventors: Yasutoyo Fusejima; Tsugutoshi Yamada; Shuri Yamada; Narimichi Takei, all of Tokyo, Japan

[73] Assignee: Freund Industrial Co., Ltd., Tokyo, Japan

[21] Appl. No.: 319,991

[22] Filed: Oct. 7, 1994

[30] Foreign Application Priority Data

Oct. 12, 1993 [JP] Japan .................................. 5-253950
Oct. 3, 1994 [JP] Japan .................................. 6-239288

[51] Int. Cl.$^6$ .................................................. A23G 7/00
[52] U.S. Cl. .................................. 118/19; 34/606; 118/20; 118/24; 118/58; 118/64; 118/303; 118/418; 366/234
[58] Field of Search ................................ 118/19, 20, 24, 118/58, 64, 303, 418; 427/2.18, 212, 242; 34/595, 604, 606, 607, 608; 432/105, 107; 366/234; 99/516, 494

[56] References Cited

U.S. PATENT DOCUMENTS

| | | | |
|---|---|---|---|
| 3,573,966 | 4/1971 | Hostetler | 427/242 |
| 3,834,347 | 9/1974 | Motoyama et al. | 118/19 |
| 4,245,580 | 1/1981 | Okawara | 118/19 |
| 4,586,457 | 5/1986 | Dunajtschik | 118/19 |
| 4,785,759 | 11/1988 | Motoyama et al. | 118/19 |
| 5,002,205 | 3/1991 | Itoh et al. | 222/130 |
| 5,050,528 | 9/1991 | Yamada et al. | 118/19 |
| 5,100,683 | 3/1992 | Singer et al. | 118/303 |
| 5,238,494 | 8/1993 | Dunajtschik | 118/19 |

FOREIGN PATENT DOCUMENTS

| | | |
|---|---|---|
| 2731351 | 4/1978 | Denmark . |
| 0362888 | 4/1990 | European Pat. Off. . |
| 8403610 | 9/1984 | Germany . |
| 50-38713 | 12/1975 | Japan . |
| 51-18397 | 6/1976 | Japan . |
| 62-19135 | 4/1987 | Japan . |
| 63-62536 | 3/1988 | Japan . |
| 124584 | 10/1989 | Japan . |
| 2207833 | 8/1990 | Japan . |

*Primary Examiner*—Laura Edwards
*Attorney, Agent, or Firm*—Kane, Dalsimer, Sullivan, Kurucz, Levy, Eisele and Richard

[57] ABSTRACT

The rotary drum has a cylindrical portion (tubular body portion) formed therein with vent holes. An annular duct is disposed at the outside of the cylindrical portion of the rotary drum in a manner to surround the cylindrical portion. This annular duct is provided with a gas supply duct and an exhaust duct. In the annular duct, partition walls define a vent path, in which the drying gas which has been supplied from the gas supply duct flows through an accumulated layer, and thereafter, flows to the exhaust duct. The direction of flow of the drying gas in the vent path is changed over by gas supply-exhaust changeover dampers.

9 Claims, 7 Drawing Sheets

GRANULAR MATERIAL COATING APPARATUS

BACKGROUND OF THE INVENTION

1. Field of the Invention

This invention relates to a granular material coating apparatus, and more particularly to a granular material coating apparatus for coating on granular materials such as tablets, granules and the like used for pharmaceuticals and food products.

2. Related Art Statement

As an apparatus for applying a sugar-coating or film-coating on the surfaces of the granular materials used as articles to be coated such as the tablets, granules used for the pharmaceuticals, nuts, confectionery and the like, there have been utilized a conventional coating pan and the like in the past. However, nowadays, there are mainly used coating apparatuses of the type in which air is made to flow through an accumulated layer of the articles coated in order to facilitate drying of the coated articles.

The coating apparatus of this type includes a coating pan rotatable about a horizontal shaft and is formed therein with a multiplicate air duct holes. Coating solution and binder solution are sprayed from a spray nozzle onto the granular materials as the articles coated, which is supplied into a coating chamber of this coating pan under the rotation of the coating pan.

The type of the coating apparatus, in which the air is made to flow through the accumulated layer formed in the bottom portion of the coating chamber for drying the coated articles, is broadly divided into two categories. The first one is the category in which an exhaust duct for exhausting drying air in the coating chamber to the outside is fixed to a support base, and an opening portion of the exhaust duct is provided in opposing to the outer peripheral surface of the coating pan in sliding contact therewith. The second one is the category in which the exhaust duct extending in parallel to a rotatable shaft of the coating pan is secured to the outer peripheral surface of the coating pan.

As the coating apparatus of the first category, there is one described in the Japanese Patent Application Publication No. 51-18397 (corresponding to the U.S. Pat. No. 3,573,966), which has been sold at the market under a trade name of "Accelacoater". This coating apparatus is constructed such that there is provided a rotary drum formed in a cylindrical portion thereof with a multiplicate holes and there is disposed an exhaust device connecting to an opening portion which is in sliding contact with the outer periphery of this rotary drum in opposing to the accumulated layer of tablets. The air in the rotary drum is sucked by this exhaust device, so that the air which has flowed in from the outer periphery of the cylindrical portion of the rotary drum can flow through the accumulated layer.

A coating apparatus improved on the coating apparatus of this first category has been proposed in the Japanese Patent Laid-Open No. 63-62536. This coating apparatus has a circular frame provided at the outside of the coating pan, and the apparatus is constructed such that at least either one of an exhaust path and a gas supply path is in sliding contact with the frame, so that sealing properties can be improved and any coating pan other than that having the cylindrical shape can be used therefore.

As the coating apparatus of the second category, the one described in the Japanese Patent Application Publication No. 50-38713 (corresponding to U.S. Pat. No. 3,834,347) is the coating apparatus which has been developed firstly. In the coating pan of this coating apparatus, a plurality of exhaust ducts disposed in parallel to the rotatable shaft are secured to the outer peripheral portion of the coating pan in such a manner that the exhaust ducts cover a multiplicate holes provided in the outer peripheral portion of the coating pan. The respective exhaust ducts extend up to one end portion of the coating pan and are connected to the exhaust path through a disc valve. The drying gas is supplied into the coating pan from another end portion toward the center of rotation of the coating pan, and the drying gas, which has flowed through the accumulated material formed at the bottom of the coating pan, passes through the exhaust ducts located at the bottom and reaches the exhaust path.

In this coating apparatus, sealing is not performed on the outer periphery of the cylindrical portion of the coating pan, so that this coating apparatus has such an advantage that sealing properties can be improved. This coating apparatus is widely known under a trade name of "Hi-Coater".

As an improved type of the second category, there is one disclosed in the Japanese Patent Laid-Open No. 2-207833 (corresponding to the U.S. Pat. No. 5,050,528), which has the similar system of supplying and exhausting of the drying gas, and is known under a trade name of "Aquacoater". As a modified example of the second category, there is one described in the Japanese Patent Application Publication No. 62-19135 (corresponding to the International Application No. PCT/EP84/00072). In this coating apparatus, both of the gas supplying and the exhausting are performed through ducts, and the respective ducts, a gas supply path and an exhaust path are successively connected to or shut off by a distributor provided at an end of the coating pan.

In the above-described coating apparatus, there is a way of use where the drying gas is made to flow from the inside to the outside through the accumulated layer. On the contrary, there is another way of use where the drying gas is made to flow from the outside to the inside through the accumulated layer. Selection of either one of the flowing direction as described above depends on various conditions including the types of the articles to be coated, the progressional stage of process and the like. Accordingly, it is desirable that changeover of the direction of the drying gas can be easily made.

Furthermore, there is such a case that, after coating is finished to make tablets of one type, another type of coating is performed in the same coating apparatus. In that case, it is desirable of cleaning the coating pan perfectly in the viewpoints of GMP (Good Manufacturing Practice) and the validation for manufacturing the high quality products.

However, in the coating apparatus of the first category, which is described in the Japanese Patent Laid-Open No. 63-62536 as above, it is necessary to change over a gas supply duct connecting to a blower into either lower duct or upper duct, otherwise to provide a blast changeover device to be connected to a gas supply path and an exhaust path. In the apparatus, it is necessary to provide an additional mechanism for changing over a direction of the flow of the drying air to an opposite direction thereto, so that the installation area becomes disadvantageously larger.

Furthermore, in the coating apparatus of the second category, a plurality of ducts are secured to the outer side of the coating pan in the axial direction, whereby not only resistance for ventilation of the drying gas has been increased, but also the cleaning works for the coating pan, also for the ducts, have been disadvantageously difficult. In order to manufacture the high quality products, it is inevitable to perform the full cleaning works for the above-described parts, and there has been the difficulties of the cleaning works as the serious problem from the viewpoint of GMP and the validation.

SUMMARY OF THE INVENTION

It is an object of the present invention to provide a coating apparatus, in which the flow of the drying gas can be easily changed over, and moreover, the cleaning works can be easily performed.

The above-described objects and other objects of the present invention, and then novel features thereof will become apparent more fully from the description of the specification in conjunction with the accompanying drawings.

The following is a simple explanation of the outlines of typical ones out of the inventions disclosed in the present application.

That is, a rotary drum rotating about a substantially horizontal axis has a tubular body portion formed therein with vent holes, and at the outside of the tubular body portion of this rotary drum, there is an annular duct fixed to a support base in a manner to surround the tubular body portion. A gas supply duct and an exhaust duct are provided in the annular duct. In the annular duct, there are also provided partition walls for defining a flow path of the flow of the gas from the gas supply duct to the exhaust duct through an accumulated layer of the granular material in the rotary drum. Separation members are provided at a first position as a guide for flowing the drying gas from the inside to the outside of the rotary drum through the accumulated layer, or at a second position as a guide for flowing the drying air from the outside to the inside of the rotary drum trough the accumulated layer. The separation members may be composed of gas supply-exhaust changeover dampers, which are changeable between the first position and the second position.

Furthermore, a central gas supply duct for supplying the gas to the central portion of the rotary drum is connected between a hollow hole formed in a shaft portion of the rotary drum and the gas supply duct. Further, the annular duct is adapted to contain the cleaning solution and the rotary drum is rotated in a state where the cleaning solution is contained, so that the rotary drum can be cleaned.

In the coating apparatus having the above-described arrangement, the annular duct is located at the outside of the cylindrical portion of the rotary drum, and the gas supply duct and the exhaust duct are connected to this annular duct, whereby the drying gas can be directly supplied to or exhausted from a coating chamber of the rotary drum from the annular duct, so that the ventilating resistance of the drying gas can be greatly decreased, and thereby enabling to perform the coating processes efficiently. Further, in order to change the direction of supplying the drying gas into the rotary drum, it is sufficient to change the position of the gas supply-exhaust changeover damper, so that the direction change of supply of the drying gas can be easily performed. Furthermore, the rotary drum is rotated in the state where the cleaning solution is contained in the rotary drum, so that the rotary drum can be easily cleaned.

DETAILED DESCRIPTION OF THE PREFERRED EMBODIMENTS

Embodiments of the present invention will hereunder be described in detail with reference to the drawings.

Figure 1:
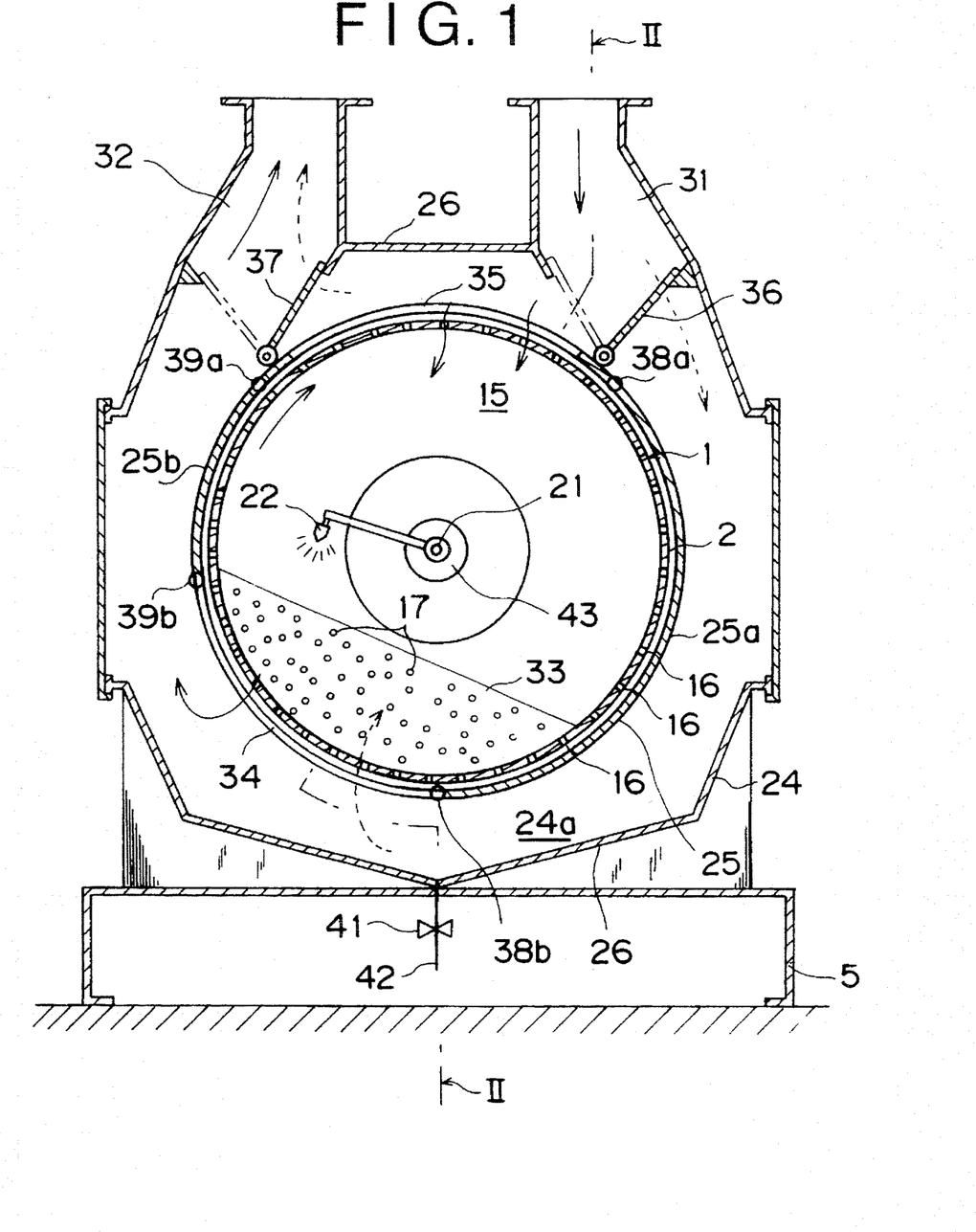
FIG. 1 is a sectional view showing an embodiment of the coating apparatus according to the present invention, taken along the line I—I in FIG. 2.
Figure 2:
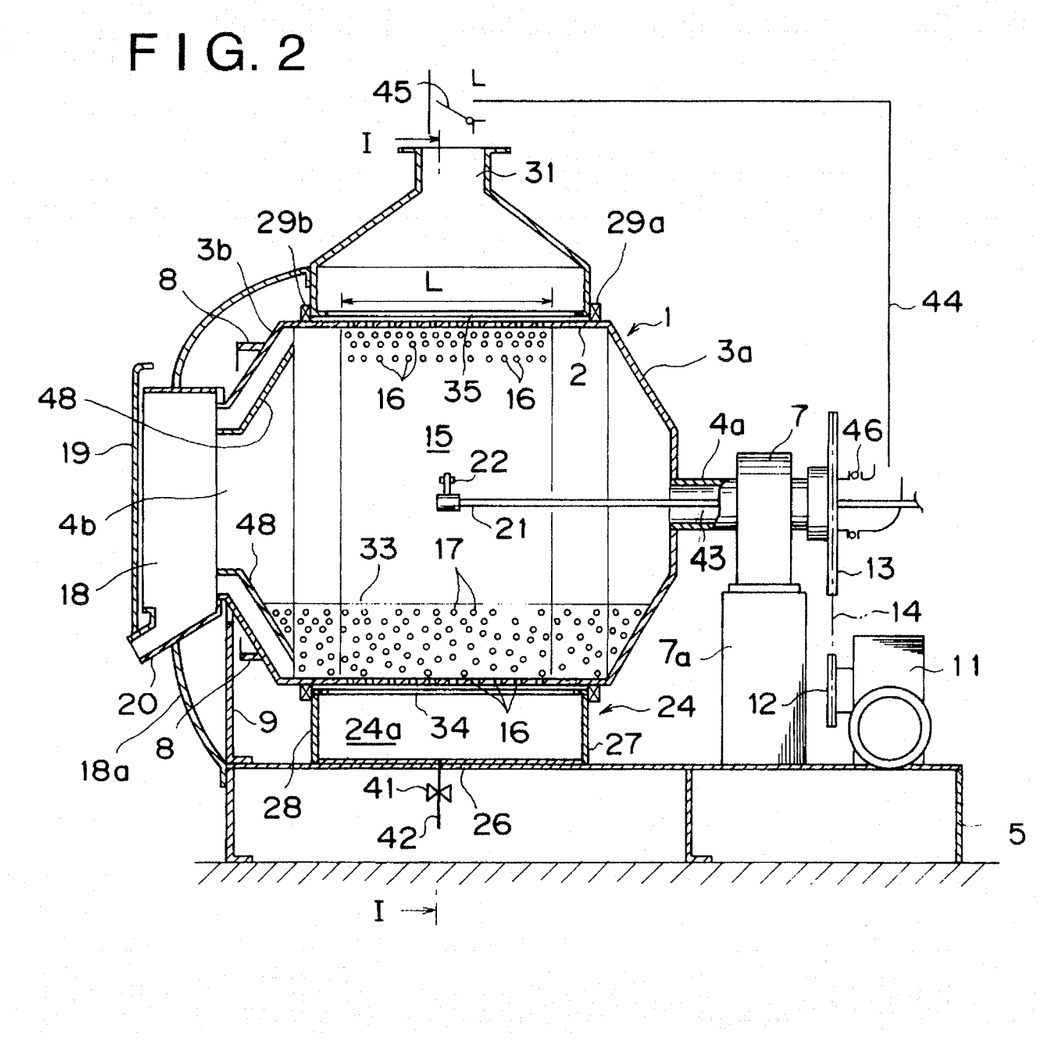
FIG. 2 is a sectional view taken along the line II—II in FIG. 1.

FIG. 1 and 2 are views showing an embodiment of the coating apparatus according to the present invention. A rotary drum 1 constituting a coating pan comprises: a cylindrical portion 2 as being a tubular body portion; conical portions 3a and 3b in a shape of conical frustum which are integrally formed on the cylindrical portion 2 at both sides in the axial direction thereof; and a hollow shaft portion 4a integrally formed on the cylindrical portion 2 through the conical portion 3a. An opening portion 4b is formed in the conical portion 3b. The shape of the conical portions 3a and 3b may be a shape being straight in the diametral direction to the cylindrical portion 2, a pyramidal shape or a concaved shape except for the shape of the conical frustum as illustrated.

The rotary drum 1 is rotatably supported on a rest 5 in a manner to be substantially horizontal in the axial line thereof. The hollow shaft portion 4a is supported by the rest 5 secured to a support base 7a through a bearing portion 7, and the conical portion 3b is supported on the rest 5 through a plurality of rollers, not shown, which are in contact with a tubular member 8 secured to the outer side thereof. These rollers are secured to a support member 9 secured to the rest 5.

In order to drive the rotary drum 1 both in the normal and reverse directions, as shown in FIG. 2, a chain 14 is wound around a sprocket 12 secured to a shaft of a motor 11 and then around a sprocket 13 fixed to the hollow shaft portion 4a, and thereby the rotary drum 1 is rotated by the motor 11. However, rotation of the motor 11 may be transmitted to the rotary drum 1 through an interlocking means such as gears without using the chain.

In the cylindrical portion 2 of the rotary drum 1, there are formed a multiplicity of vent holes 16 for communicating a coating chamber 15 with the out side of the cylindrical portion 2 in a region indicated by reference character L in the central portion in FIG. 2. Each of the vent holes 16 is intended for passing the drying gas, and has an inner diameter smaller than that of the granular material 17, although it is exaggeratedly enlarged in the drawing.

Loading of the granular material 17 as articles to be coated is performed through the opening portion 4b formed in the conical portion 3b, and a mouth portion 18 for supplying and exhausting the granular material is fixed to the rest 5 through a support member 18a in a manner to be exposed to the opening portion 4b. This mouth portion 18 is provided with a lid member 19 for opening or closing the mouth portion 18 portion 18 and with a product discharge chute 20 for discharging products after the coating process is finished.

A liquid pipe 21 is provided in the hollow shaft portion 4 to extend therethrough, and a nozzle 22 for spraying liquid such as the coating liquid and binder liquid is secured to the forward end of the liquid pipe 21.

There is provided an annular duct 24 in a manner to surround the outer side of the cylindrical portion 2. This annular duct 24 is defined by: a cylindrical inner wall portion 25 which surrounds the cylindrical portion 2 through a slit; an outer wall portion 26 which is located to the inner wall portion 25 through a space; and side wall portions 27 and 28. In the annular duct 24, there is formed a vent path 24a located at the outside of the cylindrical portion 2 in a manner to surround the cylindrical portion 2.

In order to prevent the drying air from leaking out in the axial direction through a space formed between the cylindrical portion 2 and the inner wall portion 25, an annular seal member 29a being in contact with the side wall portion 27 is provided on the outer periphery of the other end portion of the cylindrical portion 2, and an annular seal member 29b is provided in contact with the side wall portion 28 on the outer periphery of the other end portion of the cylindrical portion 2. Labyrinth seals are used as these seal members 29a and 29b, however, contact type seal members made of rubber and the like may be used for.

As shown in FIG. 1, a gas supply duct 31 and an exhaust duct 32 are respectively connected to the top portion of the annular duct 24 in changing their positions each other in the rotational direction of the rotary drum 1, which are communicated with the vent path 24a respectively, and, in the respective ducts 31 and 32, there are formed flow paths communicated with the vent path 24a. These gas supply duct 31 and the exhaust duct 32 may be set in positions contrary to the illustrated case in such a manner that the gas supply duct 31 is to be turned into the exhaust duct and the exhaust duct 32 is turned into the gas supply duct.

When the rotary drum 1 is rotated by the motor 11 in the normal direction indicated by an arrow in FIG. 1, the granular material 17 loaded into the rotary drum 1 is partially accompanied around but slips down by the gravity, whereby the top surface of an accumulated layer 33 of the granular material 17 is inclined as shown in FIG. 1.

An opening portion 34 is formed in the inner wall portion 25 constituting the annular duct 24 within a predetermined range from the bottom end portion to the normal rotating direction of the rotary drum 1 corresponding to the accumulated layer 33, and further, an opening portion 35 is formed in the inner wall portion 25 in a section between the gas supply duct 31 and the exhaust duct 32.

In the annular duct 24, a gas supply-exhaust changeover damper 36 (gas supply-exhaust changeover means) is openably provided for opening or closing the vent path 24a at a first position for directly communicating the gas supply duct 31 with the coating chamber 15 in the rotary drum 1 through the opening portion 35 as indicated by solid lines in FIG. 1, and at a second position for communicating the gas supply duct 31 with the vent path 24a in the annular duct 24 as indicated by two-dot chain lines. Further, in the annular duct 24, a gas supply-exhaust changeover damper (gas supply-exhaust changeover means) 37 is openably provided for opening or closing the vent path 24a at a first position for communicating the exhaust duct 32 with the vent path 24a as indicated by solid lines and at a second position for directly communicating the exhaust duct 32 with the coating chamber 15 in the rotary drum 1 though the opening portion 35 as indicated by two-dot chain lines.

Out of the outer periphery of the cylindrical portion 2, a section from the gas supply-exhaust changeover damper 36 to one end portion of the opening 34 is covered by a partition wall 25a of the inner wall portion 25, and a section from the gas supply-exhaust changeover damper 37 to the other end of the opening 34 is covered by a partition wall 25b of the inner wall portion 25. In order to prevent the drying gas from flowing into or out of a slit formed between the partition wall 25a and the cylindrical portion 2, seal members 38a and 38b are provided at the opposite ends of the partition wall 25a in the circumferential direction. In order to prevent the drying gas from flowing into a space formed between the partition wall 25b and the cylindrical portion 2, sealing members 39a and 39b are provided at the opposite ends of the partition wall 25b in the circumferential direction.

These seal members 38a, 38b, 39a and 39b may be formed by a seal material such as rubber being in sliding contact with the outer peripheral portion of the cylindrical portion 2, and there may be used tubular members for blowing sealing gas onto the outer peripheral surface of the cylindrical portion 2 to form air curtains.

When the gas supply-exhaust changeover dampers 36 and 37 take the first position respectively, the drying gas which has flowed in through the gas supply duct 31 first flows into the rotary drum 1 through the opening portion 35 as shown by a solid line arrow, thereafter, flows through the accumulated layer 33 and further through the opening portion 34, and flows through the vent path 24a along the partition wall 25b, and is guided to the exhaust duct 32.

On the other hand, when the gas supply-exhaust changeover dampers 36 and 37 take the second position respectively, the drying gas which has flowed in through the gas supply duct 31, is guided along the outer periphery of the partition wall 25a and flows through the vent path 24a as indicated by a broken line arrow, thereafter, flows into the rotary drum 1 through the opening portion 34 provided at a position corresponding to the accumulated layer 33, and flows through the accumulated layer 33. Subsequently, the drying gas starts from the rotary drum 1, pass through the opening portion 35 and is guided to the exhaust duct 32. Accordingly, by changing over and moving the two gas supply-exhaust changeover dampers 36 and 37 in synchronism, the flowing direction of the drying gas can be easily changed.

The bottom portion of the annular duct 24 is formed to provide a funnel shape as shown in FIG. 1, and a liquid discharge pipe 42 having an on-off cock 41 is connected to the bottom portion. When the rotary drum 1 is cleaned with the rotary drum 1 being stopped, the annular duct 24 can be used as a container for receiving the cleaning solution, so that the rotary drum 1 can be immersedly washed by the cleaning solution sprayed from the nozzle for cleaning which is provided in the rotary drum 1 or movably formed to be inserted thereinto. In that case, not only the inner peripheral surface of the rotary drum 1 but also the outer peripheral surface of the cylindrical portion 2 can be easily cleaned. After the cleaning, the cleaning solution can be discharged to the outside through the liquid discharge pipe 42. The cleaning of the rotary drum 1 may be performed with the drum 1 being rotated.

Such an arrangement may adopted that, as shown in FIG. 2, a central gas-supply duct 44 is connected to between a hollow hole 43 of the hollow shaft portion 4a and the gas supply duct 31, and that an on-off damper 45 as being an on-off means may be provided on this central gas-supply duct 44. This on-off damper 45 is combinedly used for on-off operation of the central gas-supply duct 44 and for on-off operation of the gas supply duct 31, whereby, the gas supply duct 31 is opened when the on-off damper 45 closes the central gas-supply duct 44, and the gas supply duct 31 is closed when the central gas supply duct 44 is opened.

Accordingly, in this case, when the central gas-supply duct 44 is opened by the on-off damper 45 and the gas supply-exhaust changeover damper 36 is set at the first position indicated by the solid line arrows in FIG. 1, the drying gas passes through the hollow hole 43 of the hollow shaft portion 4a, flows from the center portion of the rotary drum 1 outwardly in the radial direction, flows through the accumulated layer 33, and thereafter, is discharged from the discharge duct 32. A seal member 46 seals between an opening end of the hollow shaft portion 4a and the center gas supply duct 44. However, it is possible to eliminate the center gas supply duct 44.

In the coating apparatus illustrated above, when sugar coating is performed, the rotary drum 1 is heated by the heat of the drying gas itself, whereby sucrose in the coating solution is dried and adheres to the inner wall of the rotary drum 1. However, the sucrose can be prevented from being dried and adhering by providing a jacket on the partition wall 25a or 25b, or by cooling the conical portions 3a and 3b of the rotary drum 1. When the seal members 38a, 38b, 39a and 39b are formed to provide air curtain systems, the rotary drum 1 can be cooled by air introduced by the air curtain systems. Furthermore, a blower for supplying the drying gas, a filter for eliminating dust in the drying gas, a heat exchanger for heating the drying gas, various sensors, a control panel and the like are provided, although these parts are not shown.

As shown in FIG. 2, in order to introduce the granular material 17 coated in the rotary drum 1 into the product discharge chute 20 through the opening portion 4b, when the rotary drum 1 is reversely rotated, a plurality of product discharge members 48 are secured to the inner surface of the conical portion 3b of the rotary drum 1. Guide members as shown in the Japanese Patent Laid-Open No. 1-245845 (corresponding to the U.S. Pat. No. 5,002,205) are secured to the inner surface of the cylindrical portion 2 in opposing to the respective product discharge members 48. Accordingly, when the rotary drum 1 is reversely rotated, the granular material 17 coated in the rotary drum 1 is automatically discharged to the outside.

Description will hereunder be given of the coating process for the granular material as the articles to be coated by the coating apparatus illustrated.

In FIG. 1, when the two gas supply-exhaust changeover dampers 36 and 37 are changed over to the respective positions indicated by the solid lines to make the drying gas to flow trough, the respective gas supply-exhaust changeover dampers 36 and 37 are set at the positions illustrated. First, the lid member 19 is opened to load the granular material 17 into the coating chamber 15 of the rotary drum 1. Then, in a state where the rotary drum 1 is rotated in the normal direction by the motor 11, the coating solution is sprayed from the nozzle 22 and the drying gas is supplied from the gas supply duct 31.

As indicated by the solid lines in FIG. 1, the drying gas passes through the opening portion 35, and flows into the rotary drum 1 through the vent holes 16 formed in the cylindrical portion 2. The drying gas further flows through the accumulated layer 33, passes through the vent holes 16 of the rotary drum 1, and then flows into the annular duct 24 through the opening portion 34. Thereafter, the drying gas which has flowed into the annular duct 24 passes the exhaust duct 32 and is discharged to the outside.

In order to change the method of flowing of the drying gas in which the drying gas is made to flow first through the accumulated layer 33 and thereafter flows into the rotary drum 1, the two gas supply-exhaust changeover dampers 36 and 37 are changed over to the respective positions indicated by the two-dot chain lines in FIG. 1. In this case, the drying gas from the gas supply duct 31 flows along the outer periphery of the partition wall 25a and flows into the rotary drum 1 through the accumulated layer 33 from the outside of the rotary drum 1. Then, the drying gas which has flowed into the rotary drum 1 is guided along the exhaust duct 32 and discharged to the outside.

Further, as shown in FIG. 2, when the central gas-supply duct 44 is connected to between the hollow hole 43 of the hollow shaft portion 4a and the gas supply duct 31, the on-off damper 45 is operated to open the central gas-supply duct 44 along with closing the gas supply duct 31, and further the gas supply-exhaust changeover damper 37 is set at the position indicated by the solid lines. With this arrangement, the drying gas which has been supplied from the gas supply duct 31 pass through the central gas-supply duct 44 and is supplied to the central portion of the rotary drum 1 from the hollow hole 43 formed in the hollow shaft portion 4a. The drying gas passes through the accumulated layer 33 and flows into the annular duct 24 located at the outside of the rotary drum 1, and then the drying gas is discharged from the exhaust duct 32 to the outside.

As shown in FIG. 1, the annular duct 24 is provided at the outside of the cylindrical portion 2 of the rotary drum 1, whereby the construction of the flow paths of the drying gas in supplying and exhausting is simplified, and the flow course of the drying gas is shortened as a whole, so that resistance for ventilation of the drying gas can be decreased, thus enabling to obtain an efficient coating apparatus being low in the pressure loss of the drying gas.

When cleaning of the rotary drum 1 is performed before changing the coating liquid to be used or the coating process is performed for a predetermined period of time or number of times, the cleaning solution is poured in through the opening portion 4b or through a pour-in opening, not shown, in a state where the granular material 17 is absent. With this arrangement, the inner surface of the rotary drum 1, and moreover, the inner and outer surfaces of the cylindrical portion 2 can be cleaned. During cleaning, in order to prevent the cleaning solution from leaking out through the gaps of labyrinth seals 29a and 29b, expansion seal members which are the type of expanding by air pressure are assembled near the respective labyrinth seals 29a and 29b, and the expansion seal members expand during cleaning, thereby preventing the cleaning solution from leaking out through the labyrinth seals.

The illustrated annular duct 24 is formed by the inner wall portion 25, the outer wall portion 26, and the both sidewall portions 27 and 28. However, the annular duct 24 may be formed by the cylindrical portion 2 of the rotary drum 1, the outer wall portion 26 and the both side wall portions 27 and 28 without using the cylindrical inner wall portion 25. In that case, partition walls are provided at positions in opposing to the partition walls 25a and 25b as shown in FIG. 1 in a manner to cover the outer side of the cylindrical portion 2 through a space in the annular duct 24.

The annular duct 24 covering the outer side of the rotary drum 1 has a function as a housing of the coating apparatus, but the whole apparatus shown in the Figures may be covered by a housing not shown.

Furthermore, in the illustration, the gas supply-exhaust changeover dampers 36 and 37, which are capable of on-off operating at the first position indicated by the solid lines and at the second position indicated by the two-dot chain lines, are provided in the annular duct 24. However, fixed type partition members may be used and secured to the respective positions indicated by the solid lines. In that case, the drying gas can flow only in the direction indicated by the solid lines in FIG. 1. On the other hand, the fixed type partition members may be secured to the respective positions indicated by the two-dot chain lines. In this case, the drying gas can flow only in the direction indicated by the two-dot chain lines in FIG. 1.

Figure 3A:
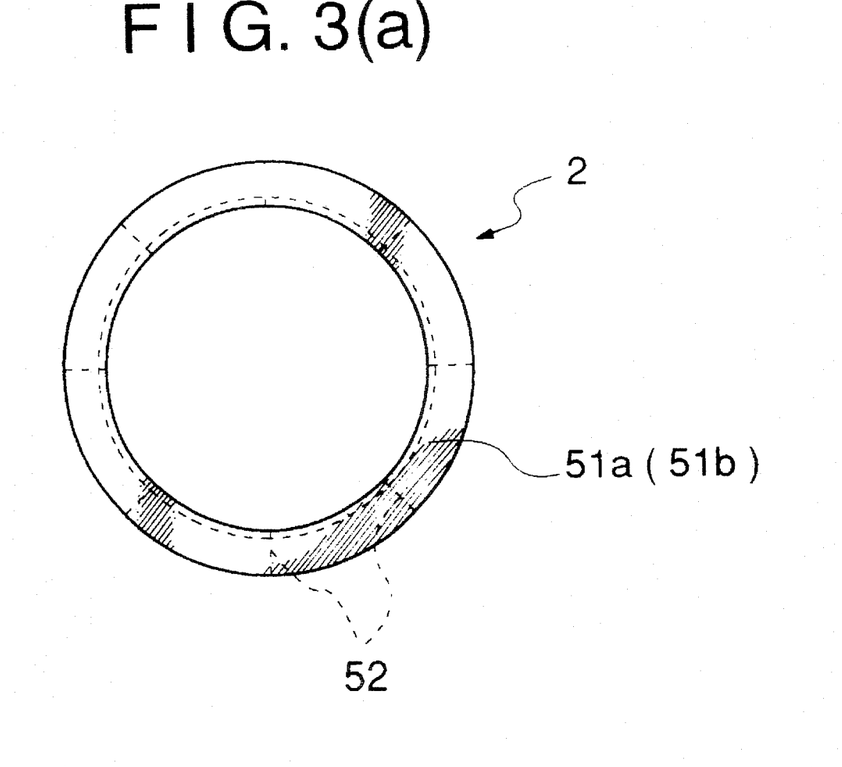
FIG. 3(a) is a front view showing another embodiment of the rotary drum according to the present invention.
Figure 3B:
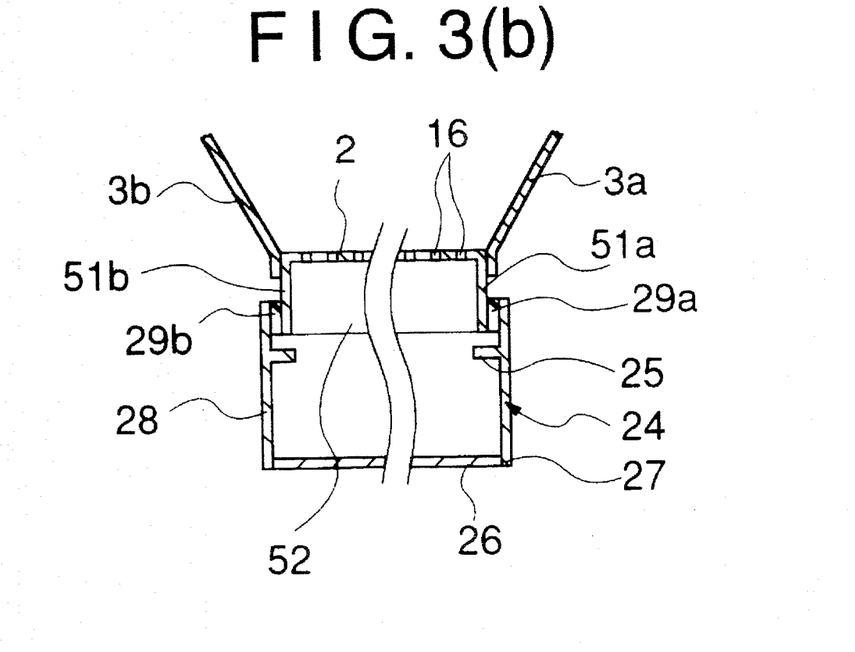
FIG. 3(b) is a partially enlarged sectional view of FIG. 3(a)

FIG. 3(a) and 3(b) are the views partially showing the rotary drum 1 in another embodiment of the present invention. In the illustration, circular frame members 51a and 51b are respectively provided at opposite end portions in the axial direction of the cylindrical portion 2 formed therein with a multiplicity of vent holes 16. A plurality of partition plates 52 extending in the radial direction of the drum 1 are provided at the outside of the cylindrical portion 2 and at the position between the both frame members 51a and 51b. Then, the frame members 51a and 51b are overlapped with the side wall portions 27 and 28, and the seal members 29a and 29b are provided therebetween. The seal members 29a and 29b as shown in FIG. 3(b) are the contact type seals made of rubber, however, the labyrinth seals may be used as described above.

Figure 4A:
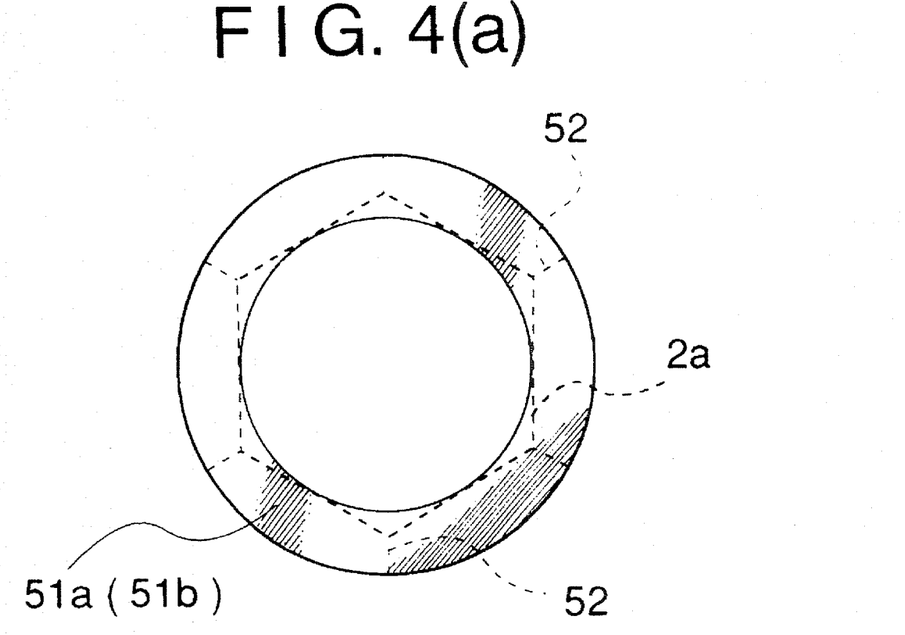
FIG. 4(a) is a front view showing a main body of the rotary drum in another embodiment of the present invention.

FIG. 4(a) is the view partially showing the rotary drum in another embodiment of the present invention. In this case, the tubular body portion 2 is formed to provide a polygonal tubular portion 2a which is a hexagon in section, and a partition plate 52 is provided at the outside of a corner portion of this polygonal tubular portion 2a.

Figure 4B:
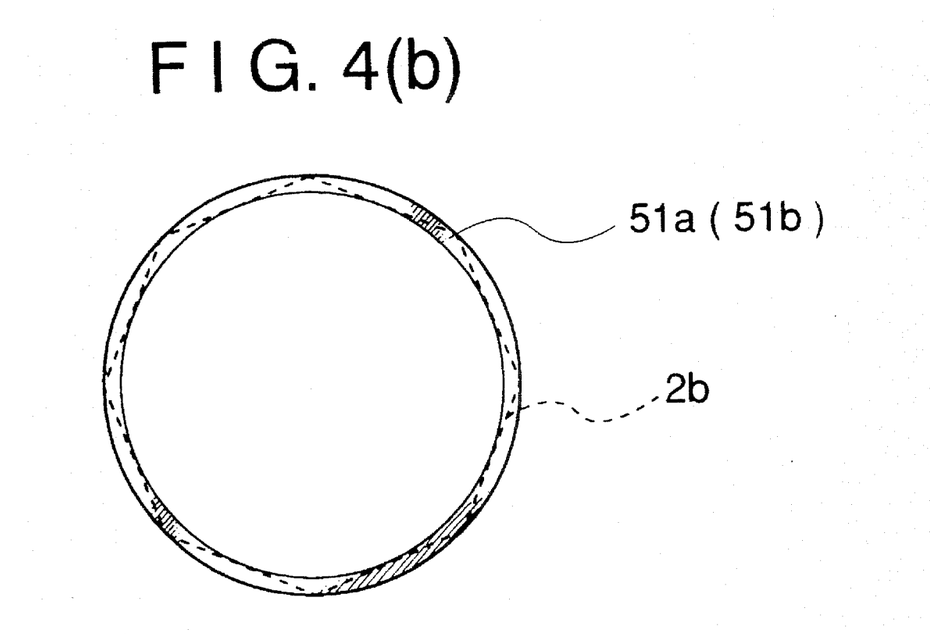
FIG. 4(b) is a front view showing the main body of the rotary drum in a further embodiment of the present invention.

FIG. 4(b) is the view partially showing the rotary drum in a further embodiment of the present invention. In this case, the tubular body portion is formed to provide a polygonal tubular portion 2b which is an octagon in section. Then, the outer sides of the corner portions are coincided with the outer peripheral surfaces of the frame members 51a and 51b, whereby the partition plates 52 in FIGS. 3 and 4 are not used.

As described above, the shape of the tubular body portion of the rotary drum 1 is of a tubular one, and only if the vent holes 16 are formed, various sectional shapes such as an ellipse other than the hexagon and octagon may be adopted.

Figure 5:
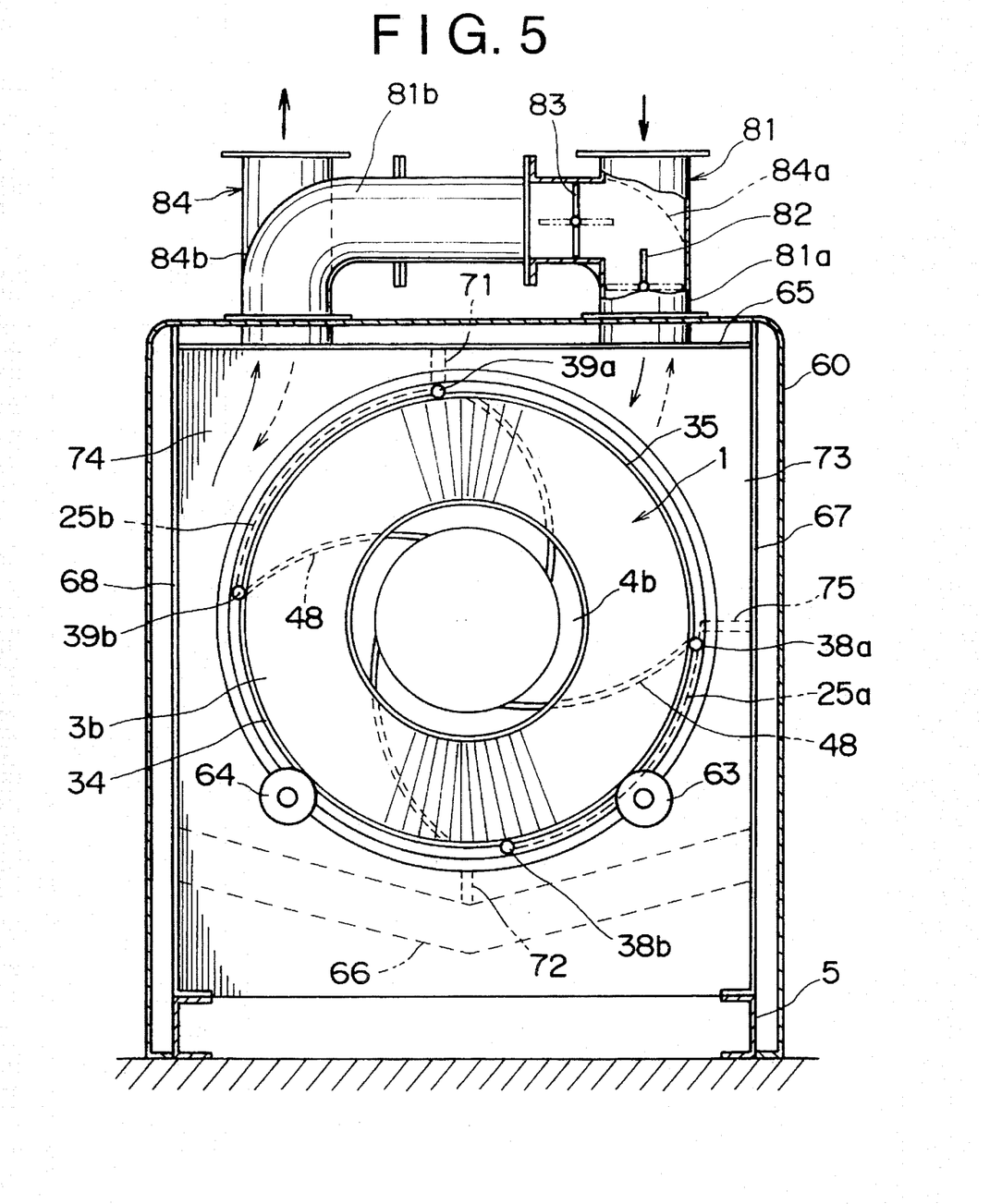
FIG. 5 is a partially cutaway front view showing a further embodiment of the granular material coating apparatus according to the present invention.
Figure 6:
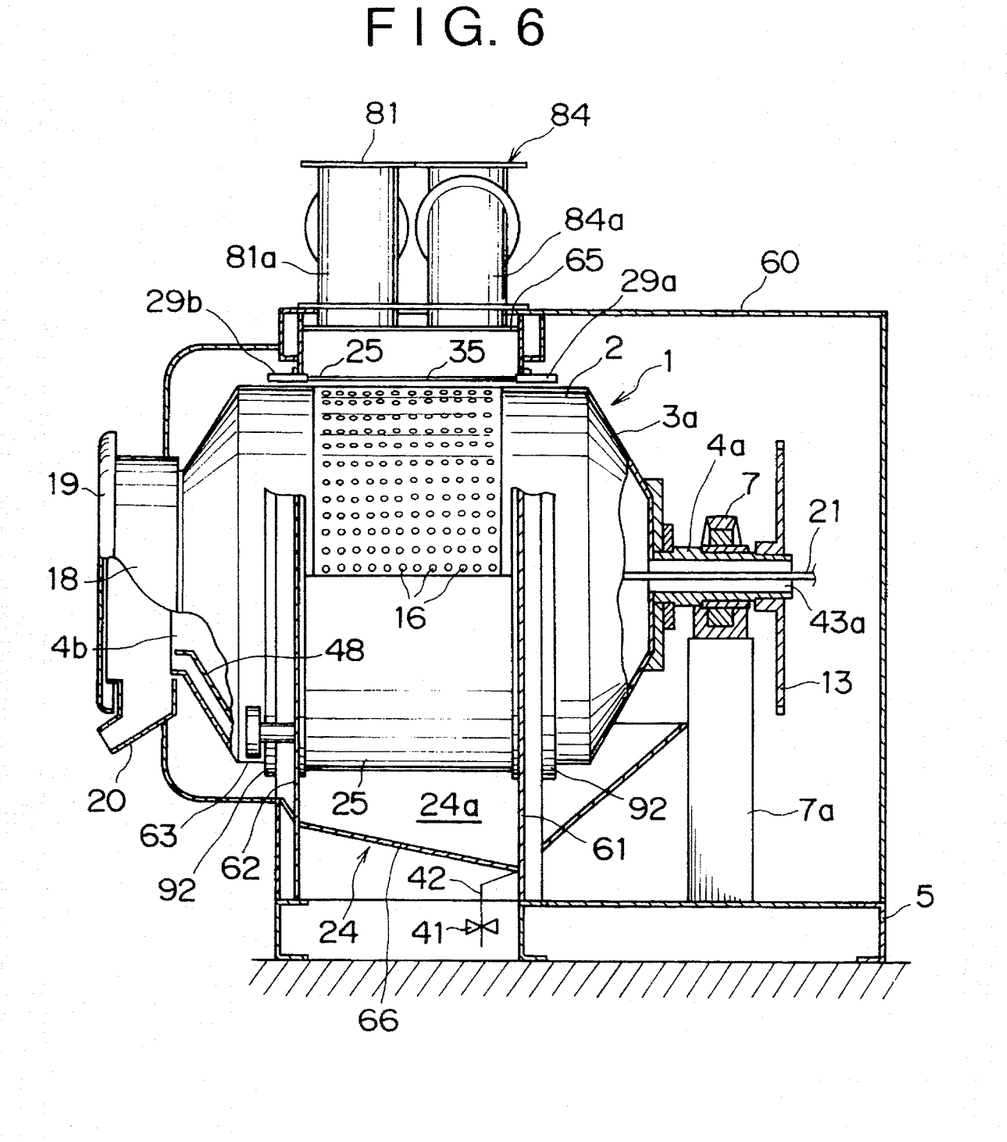
FIG. 6 is a partially cutaway side view of FIG. 5.

FIGS. 5 and 6 are the views showing the further embodiment of the granular material coating apparatus according to the present invention. In these drawings, same reference numerals are used for same or similar members corresponding to ones shown in the above embodiments.

The rotary drum 1 is rotatably supported in a housing 60 installed on the rest 5. In this housing 60, two support plates 61 and 62 are secured with a predetermined interval therebetween. Two rollers 63 and 64 are rotatably mounted on the support plate 61, and these rollers 63 and 64 support end portions of the cylindrical portion 2 of the rotary drum 1.

The hollow shaft portion 4a is rotatably supported by the bearing portion 7 secured to the support base 7a, and the rotary drum is arranged to rotate both in the normal and reverse directions.

A cylindrical inner wall portion 25 is secured to the support plates 61 and 62, and the inner wall portion 25 is located at the outside of the cylindrical portion 2 of the rotary drum 1 through a space therebetween. In the housing 60, there are provided a horizontal wall portion 65, an inclined wall portion 66 and vertical wall portions 67 and 68, and an outer wall portion is formed by these wall portions 65 to 68. The support plates 61 and 62 constitute side walls respectively, and the annular duct 24 is formed by the support plates 61 and 62, the inner wall portion 25 and the wall portions 65 to 68.

The vent path 24a formed by the annular duct 24 to provide an annular shape at the outside of the rotary drum 1 is partitioned into two spaces formed of a first gas supply-exhaust space 73 communicating with the opening portion 35 and a second gas supply-exhaust space 74 communicating with the opening portion 34, defined by a partition plate 71 provided between the horizontal wall portion 65 and the partition wall 25b and by partition wall 72 provided between the inclined wall portion 66 and the partition wall 25a. A further partition plate 75 may be provided between the vertical wall portion 67 and the partition wall 25a.

A gas supply duct 81, having a branching portion 81a communicating with the first gas supply-exhaust space 73 and a branching portion 81b communicating with the second gas supply-exhaust space 74, is connected to the housing 60. Gas supply-path changeover dampers 82 and 83 are openably provided in the branching portions 81a and 81b, respectively. As indicated by solid lines in FIG. 5, when the gas supply-path changeover damper 82 is set to open the branching portion 81a and the gas supply-path changeover damper 83 is set to close the branching portion 81b, the drying gas is supplied from the branching portion 81a into the coating chamber 15 of the rotary drum 1 through the first gas supply-exhaust space 73 and the opening portion 35.

As shown in FIG. 6, an exhaust duct 84 is connected to the housing 60 adjacent to the gas supply duct 81. The exhaust duct 84 has a branching portion 84a communicating with the first gas supply-exhaust space 73 and a branching portion 84b communicating with the second gas supply-exhaust space 74. Exhaust-path changeover dampers, not shown, are respectively provided in the branching portions 84a and 84b for opening and closing the branching portions 84a and 84b alternatively, and whereby the drying gas is exhausted through either one of the branching portions 84a and 84b.

As indicted by solid line arrows, with this arrangement, when the drying gas is supplied from the branching portion 81 of the gas supply duct 81 into the coating chamber 15 through the opening portion 35, the drying gas which has flowed through the accumulated layer passes through the opening portion 34, thereafter, reaches the second gas supply-exhaust space 74, passes through the branching portion 84b and is exhausted through the exhaust duct 84.

On the other hand, when the drying gas is supplied from the branching portion 81b, the gas supply-path changeover damper 82 in the branching portion 81a of the gas supply duct 81 is closed at the position shown by two-dot chain lines in FIG. 5 and the gas supply-path changeover damper 83 in the branching portion 81b is opened. Further, the exhaust-path changeover damper formed in the branching portion 84a of the exhaust duct 84 is opened, and the exhaust-path changeover damper formed in the branching portion 84b is closed. With this arrangement, the drying gas supplied from the branching portion 81b flows into the coating chamber 15 through the second gas supply-exhaust space 74 and the opening portion 34, as indicated by a broken line arrow. Thereafter, the drying gas is exhausted to the outside from the exhaust duct 84 though the opening portion 35 and the branching portion 84a.

Figure 7:
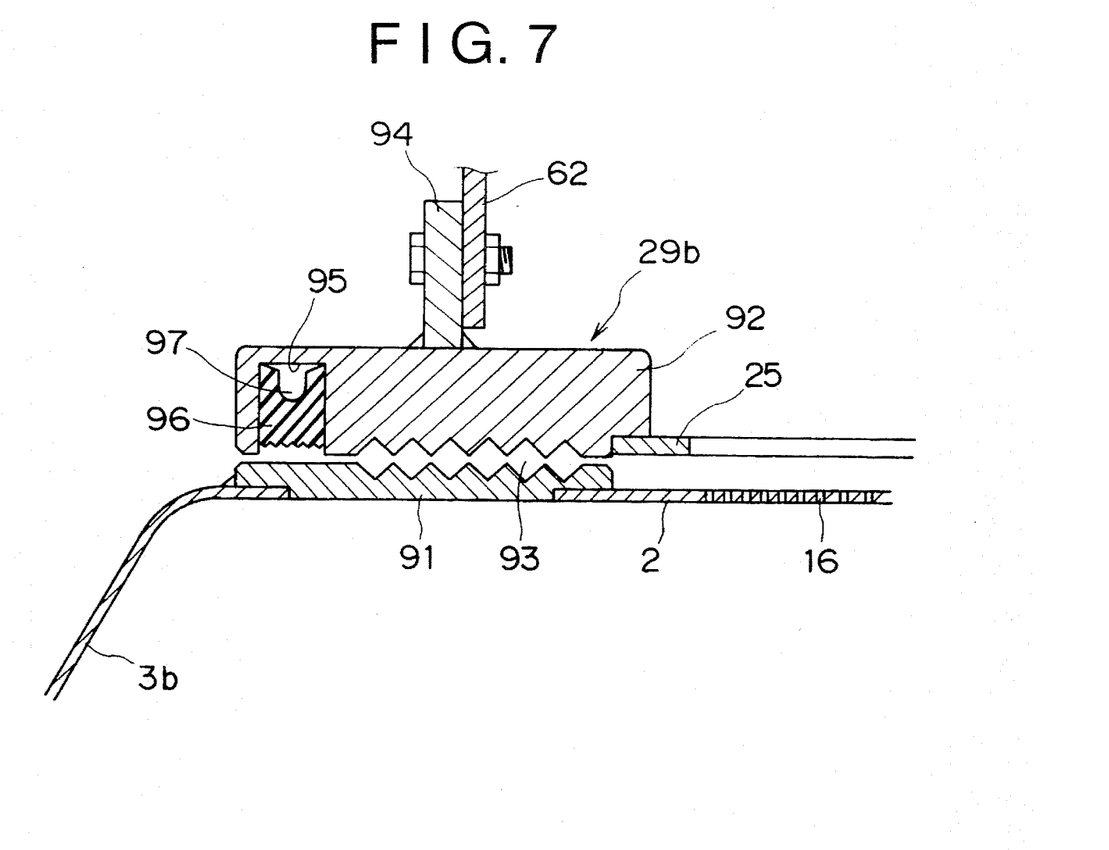
FIG. 7 is a sectional view showing the labyrinth seal shown in FIGS. 5 and 6.

FIG. 7 is the enlarged view showing the labyrinth seal 29b shown in FIG. 6. This labyrinth seal 29a has an annular seal portion 91 on the rotating side which is provided on the cylindrical portion 2 of the rotary drum 1, and has an annular seal 92 on the fixed side which is located at the outside of and in opposing to the annular seal 91 through gaps 93. The seal portion 92 on the fixed side is fixed to the support plate 62 by an annular support frame 94. The other labyrinth seal 29a shown in FIG. 6 has the same construction as the labyrinth seal 29b.

In a state where the rotary drum 1 is rotated, the labyrinth seal 29a and 29b prevent the drying gas from leaking in the axial direction through gaps formed between the cylindrical portion 2 and the inner wall portion 25. An expansion seal member 96 is mounted in an annular groove 95 formed in the seal portion 92. When compressed air is supplied into an air chamber 97 formed in the seal member 96, the expansion seal member 96 comes into tightly contact with the outer peripheral surface of the seal portion 91 on the rotating side. With this arrangement, leakage of liquid through the gaps 93 can be prevented in a state where the rotary drum 1 is stopped.

The rotary drum 1 of the coating apparatus shown in FIGS. 5 and 6 may be formed to provide a shape shown in FIGS. 3 and 4.

The invention disclosed by the present invention has been described in detail hereinabove in conjunction with the embodiments, however, the present invention should not necessarily be limited to the above embodiments and it is needless to say that the present invention can be variously modified within the range not departing from the technical gist thereof.

For example, not only heated gas but also cooled gas may be used as the drying gas supplied into the coating chamber 15.

The following is the brief description of the effects obtainable by the typical inventions out of them disclosed in the present application.

(1) The annular duct is provided in a manner to surround the vent holes formed in the tubular body portion at the outside of the tubular body portion constituting the rotary drum, and the drying gas is supplied through the annular duct, so that the drying efficiency can be improved with low resistance for ventilation of the drying gas supplied from the gas supply duct to the annular duct.

(2) The gas supply-exhaust changeover means for changing over the flow of the drying gas are incorporated in the annular duct, so that the flow of the drying gas can be easily changed by actuating the changeover means.

(3) The whole construction of the coating apparatus is simplified as compared with the conventional one, so that the installation area can be decreased.

(4) The annular duct is provided at the outside of the rotary drum in a manner to surround the rotary drum and the annular duct is provided with the gas supply duct and the exhaust duct, whereby the duct extending in the axial direction can be dispensed with. The interior of the duct becomes free from contamination and the interiors of the rotary drum and the annular duct can be easily cleaned, so that the high quality coating can be achieved, thus enabling to obtain a satisfactory coating apparatus from the viewpoint of GMP (Good Manufacturing Practice) and the validation.

What is claimed is:

1. A granular material coating apparatus for spraying a liquid coating solution onto a granular material to apply coating to said granular material, comprising:

a rotary drum rotated about a substantially horizontal axis and rotatably supported by a support base;

a coating chamber including a spraying nozzle therein formed in said rotary drum, said coating chamber arranged to accumulate said granular material at bottom portion thereof;

a tubular body portion formed in said rotary drum;

a multiplicity of vent holes formed in said tubular body portion, said vent holes communicating with said coating chamber;

an annular duct fixed to said support base surrounding said rotary drum and forming a vent path positioned outside of said tubular body portion;

a gas supply duct connecting to said annular duct for supplying drying gas;

an exhaust duct connecting to said annular duct for exhausting the drying gas;

said annular duct including partition walls disposed about said drum, said walls including openings forming a flowing path from said gas supply duct to said exhaust duct through the bottom portion of said coating chamber; and separation means disposed within said vent path between said gas supplying duct and said gas exhaust duct and movable between first and second positions wherein at said first position the drying gas flow is from said gas supply duct into an upper portion of said rotary drum, through said bottom portion of said rotary drum and to said exhaust duct, and at said second position the drying gas flow is from said gas supply duct, through said bottom portion of said rotary drum, out said upper portion of said rotary drum and to said exhaust duct.

2. The granular material coating apparatus as set forth in claim 1, wherein said annular duct is defined by said tubular body portion, an outer wall portion located in opposition to said tubular body portion through a space and two side walls provided at opposite sides of said outer wall portion, and said annular duct and said tubular body portion are partitioned from each other by partition walls with upper and lower portions of said annular duct being left.

3. The granular material coating apparatus as set forth in claim 1, wherein said annular duct is defined by an inner wall portion disposed outside of said tubular body portion through a space, an outer wall portion located in opposition to said inner wall portion through a space, and by opposite side wall portions connecting with said inner wall portion and said outer wall portion at respective opposite end portions thereof, and opening portions are respectively formed in said inner wall portion in opposition to the upper and lower portions of said annular duct.

4. The granular material coating apparatus as set forth in claim 1, wherein said separation means is formed of damper means which are openable and closable at said first position and said second position.

5. The granular material coating apparatus as set forth in claim 1, wherein said separation means includes:

a first gas supply-exhaust changeover damper which is changeable over between a first position for directly guiding the drying gas supplied from said gas supply duct to said rotary drum and a second position for guiding the drying gas into the bottom portion of said rotary drum through said annular duct; and a second gas supply-exhaust changeover damper changeable over between a first position for guiding the drying gas, which has flowed into said annular duct from said rotary drum, to said exhaust duct through said annular duct and a second position for directly guiding the drying gas, which has flowed out of said rotary drum, to the outside.

6. The granular material coating apparatus as set forth in claim 1, wherein said apparatus further comprises:

a hollow hole formed either in one of shaft portions provided at opposite sides in axial direction of said tubular body portion;

a central gas supply duct connecting to said gas supply duct; and an on-off means provided in said central gas supply duct for opening and closing a blow path of said central gas supply duct.

7. The granular material coating apparatus as set forth in any one of claims 1 to 6, wherein a cleaning solution discharge opening is formed at bottom portion of said annular duct, and the cleaning solution supplied into said annular duct is made to flow into said rotary drum, so that said rotary drum can be cleaned.

8. The granular material coating apparatus as set forth in claim 1 wherein said separation means are disposed within said annular duct.

9. A granular material coating apparatus, for spraying a liquid coating solution onto a granular material to apply coating to said granular material, comprising:

a rotary drum rotated about a substantially horizontal axis and rotatably supported by a support base;

a coating chamber including a spraying nozzle therein formed in said rotary drum, said coating chamber arranged to accumulate said granular material at bottom portion thereof;

a tubular body portion formed in said rotary drum;

a multiplicity of vent holes formed in said tubular body portion, said vent holes communicating with said coating chamber;

an annular duct fixed to said support base surrounding said rotary drum and forming a vent path positioned outside of said tubular body portion;

separation means disposed within said annular duct for partitioning an interior of said annular duct into two spaces formed of a first gas supply-exhaust space communicating with an upper portion of said coating chamber and a second gas supply-exhaust space communicating with a lower portion of said coating chamber through an accumulated layer of said granular material;

a gas supply duct communicating with either one of said first gas supply-exhaust space and said second gas supply-exhaust space, for guiding drying gas; and an exhaust duct communicating with either another one of said first gas supply-exhaust space and said second gas supply-exhaust space, for guiding the drying gas to outside.

* * * * *